United States Patent
Vo et al.

(10) Patent No.: US 9,234,124 B2
(45) Date of Patent: Jan. 12, 2016

(54) DIMER ACID GRAFTED POLYMER FOR STABILIZING PARTICULATE IN A WELL

(71) Applicant: Halliburton Energy Services, Inc., Houston, TX (US)

(72) Inventors: Loan K. Vo, Houston, TX (US); Tingji Tang, Spring, TX (US); Philip D. Nguyen, Houston, TX (US)

(73) Assignee: Halliburton Energy Services, Inc., Houson, TX (US)

( * ) Notice: Subject to any disclaimer, the term of this patent is extended or adjusted under 35 U.S.C. 154(b) by 45 days.

(21) Appl. No.: 14/376,986

(22) PCT Filed: Aug. 9, 2013

(86) PCT No.: PCT/US2013/054252
§ 371 (c)(1),
(2) Date: Aug. 6, 2014

(87) PCT Pub. No.: WO2015/020664
PCT Pub. Date: Feb. 12, 2015

(65) Prior Publication Data
US 2015/0353812 A1    Dec. 10, 2015

(51) Int. Cl.
| C09K 8/52 | (2006.01) |
| E21B 43/26 | (2006.01) |
| E21B 43/16 | (2006.01) |
| C09K 8/80 | (2006.01) |

(52) U.S. Cl.
CPC ... *C09K 8/52* (2013.01); *C09K 8/80* (2013.01); *E21B 43/16* (2013.01); *E21B 43/26* (2013.01)

(58) Field of Classification Search
None
See application file for complete search history.

(56) References Cited

U.S. PATENT DOCUMENTS

| 2,477,544 | A | * | 7/1949 | Moe ................. C08B 37/0087 516/107 |
| 2,602,789 | A | * | 7/1952 | Schwartz ............. C08B 13/00 536/108 |
| 3,723,409 | A | * | 3/1973 | Yueh ................. C08B 37/0096 424/70.13 |
| 5,217,074 | A | | 6/1993 | McDougall et al. |
| 6,439,309 | B1 | | 8/2002 | Matherly et al. |
| 6,569,983 | B1 | | 5/2003 | Treybig et al. |
| 7,040,403 | B2 | | 5/2006 | Nguyen et al. |
| 7,156,194 | B2 | | 1/2007 | Nguyen |
| 7,956,015 | B2 | | 6/2011 | Dino |
| 8,307,901 | B2 | | 11/2012 | Weaver et al. |
| 2009/0075845 | A1 | * | 3/2009 | Abad ..................... C09K 8/12 507/117 |
| 2010/0016179 | A1 | | 1/2010 | Duncum et al. |

(Continued)

FOREIGN PATENT DOCUMENTS

| WO | 2012080465 | | 6/2012 |
| WO | 2012080465 | A1 | 6/2012 |

OTHER PUBLICATIONS

International Search Report and Written Opinion dated May 19, 2014 for Application No. PCT/US2013/054252.

*Primary Examiner* — Alicia Bland
(74) *Attorney, Agent, or Firm* — Holly Soehnge; Baker Botts L.L.P.

(57) ABSTRACT

A fluid is provided including: (A) an aqueous phase; and (B) a dimer acid grafted polymer, wherein the dimer acid grafted polymer is at least sparingly soluble in water, wherein the polymer is dispersed, hydrated, or dissolved in the aqueous phase. The fluid can be used, for example, in a method of treating a well, including: (A) forming a fluid comprising a dimer acid grafted polymer, and (B) introducing the fluid into a treatment zone of a well.

22 Claims, 1 Drawing Sheet

(56) References Cited

U.S. PATENT DOCUMENTS

2010/0305009 A1* 12/2010 Westfechtel ........... C09K 8/035 507/138
2012/0267102 A1 10/2012 Huang et al.
2012/0325474 A1 12/2012 Bicerano
2014/0332213 A1* 11/2014 Zhou ..................... C09K 8/805 166/280.2

* cited by examiner

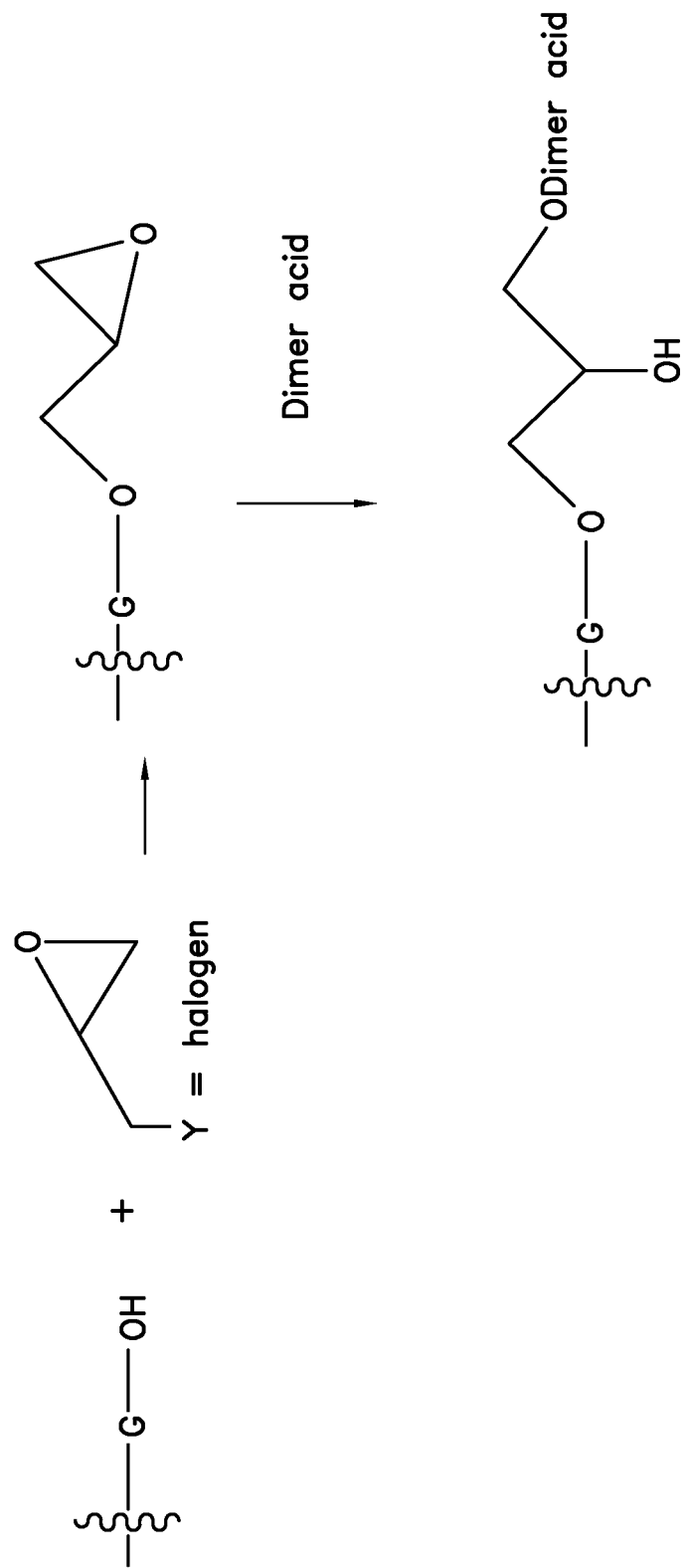

DIMER ACID GRAFTED POLYMER FOR STABILIZING PARTICULATE IN A WELL

CROSS-REFERENCE TO RELATED APPLICATIONS

Not applicable.

TECHNICAL FIELD

This disclosure is in the field of producing crude oil or natural gas from subterranean formations. More specifically, the disclosure generally relates to fluids and methods of stabilizing particulates in a treatment zone of a subterranean formation penetrated by a wellbore of a well.

BACKGROUND

Oil or gas is obtained from a subterranean formation by drilling a wellbore that penetrates a hydrocarbon-bearing formation. It is desirable to maximize both the rate of flow and the overall amount of flow of hydrocarbon from the subterranean formation to the surface.

One way that the rate of hydrocarbon flow and the overall amount of hydrocarbon flow can be reduced is by fines production or sand migration in the formation or by precipitation. The relatively high velocity in the permeable matrix of the subterranean formation near the wellbore is sometimes sufficient to mobilize particulates. These particulates can be carried and then plug flow channels in the formation, a proppant pack, or a gravel pack. It is desirable to minimize fines or sand migration, since such particulates block flow paths, choking the potential production of the well. In addition, such particulates can damage downhole and surface equipment, such as screens, pumps, flow lines, storage facilities, etc.

Wellbores often penetrate subterranean formations that contain unconsolidated particulates that may migrate when oil, gas, water, or other fluids are produced or flowed back from the subterranean formation.

Devices such as screens and slotted liners are often used to provide support for these unconsolidated formations to inhibit formation collapse. Usually, the annulus around the support device is gravel packed to reduce the presence of voids between the device and the borehole. Typically, such gravel packing operations involve the pumping and placement of a quantity of a desired size of particulate material into the annulus between the tubular device and the borehole of the wellbore. Gravel packing forms a filtration bed near the well bore that acts as a physical barrier to the transport of unconsolidated formation fines with the production of hydrocarbons. These support devices provide support for the wellbore and gravel packing and prevent some fines from entering the hydrocarbon flow into the well.

Some types of screens are adapted to be expanded to contact the wellbore wall either with or without gravel packing. It is however, impossible to eliminate all voids between the screen and the wellbore wall. Fines fill these voids blocking flow, and, in some instances, fines flowing through these voids erode the screen destroying its effectiveness.

A common type of gravel packing operation involves placing a gravel pack screen in the well bore and packing the surrounding annulus between the screen and the well bore with gravel of a specific mesh size designed to prevent the passage of formation sand or fines. The gravel pack screen is generally a filter assembly used to retain the gravel placed during gravel pack operation. A wide range of sizes and screen configurations are available to suit the characteristics of the gravel pack sand. Similarly, a wide range of gravel sizes is available to suit the characteristics of the unconsolidated or poorly consolidated particulates in the subterranean formation. The resulting structure presents a barrier to migrating sand from the formation while still permitting fluid flow.

Gravel packs can be time consuming and expensive to install. Due to the time and expense needed, it is sometimes desirable to place a screen without the gravel and, particularly in cases in which an expandable screen is being placed, it may be unrealistic to place a bed of gravel between the expandable screen and the well bore. Even in circumstances in which it is practical to place a screen without a gravel pack, it is often difficult to determine an appropriate screen size to use as formation sands tend to have a wide distribution of sand grain sizes. When small quantities of sand are allowed to flow through a screen, screen erosion becomes a significant concern. As a result, the placement of gravel as well as the screen is often necessary to control the formation sands.

An expandable screen is often installed to maintain the diameter of the wellbore for ease of access at a later time by eliminating installation of conventional screens, gravel placement, and other equipment. However, the ability to provide universal screen mesh that can handle wide particle size distribution of formation sand is unrealistic, if not impossible.

Another method used to control particulates in unconsolidated formations involves consolidating a subterranean producing zone into hard, permeable masses. Consolidation of a subterranean formation zone often involves applying a resin followed by a spacer fluid and then a catalyst. Such resin application may be problematic when, for example, an insufficient amount of spacer fluid is used between the application of the resin and the application of the external catalyst. The resin may come into contact with the external catalyst in the well bore itself rather than in the unconsolidated subterranean producing zone. When resin is contacted with an external catalyst, an exothermic reaction occurs that may result in rapid polymerization, potentially damaging the formation by plugging the pore channels, halting pumping when the well bore is plugged with solid material, or resulting in a downhole explosion as a result of the heat of polymerization. Also, these conventional processes are not practical to treat long intervals of unconsolidated regions due to the difficulty in determining whether the entire interval has been successfully treated with both the resin and the external catalyst.

In addition to the unconsolidated formation sands often found in subterranean formations, particulate materials are often introduced into subterranean zones in conjunction with conductivity enhancing operations and sand control operations. Conductivity enhancing and sand control operations may be performed as individual treatments, or may be combined where desired.

Preventing formation sand and fines from migrating from an unconsolidated formation has always been a challenge. While previously known treatment methods for unconsolidated formation provide improved particulate control, multiple treatment steps that are time consuming and expensive are usually required. Therefore, it is desirable to develop a relatively simple and relatively inexpensive treatment composition and method to improve or maintain the rate of fluid flow while reducing particulate migration.

General Description of Embodiments

This disclosure provides a water-soluble polymer grafted with a dimer acid group. Such a modified polymer is sometimes referred to herein as a dimer acid grafted polymer or simply as a grafted polymer. The grafted polymer can optionally include one or more chemical functional groups susceptible to crosslinking by suitable chemical cross linkers.

Such a grafted polymer can be used as a viscosity-increasing agent when hydrated or dissolved in an aqueous phase. The viscosity-increasing properties of the grafted polymer can be used, for example, in drilling or treatment fluids for use in a well. The viscosity-increasing properties can help with proppant transport or fluid-loss control of a fluid.

Such a grafted polymer can be degraded to reduce the length of the polymer chains, optionally break crosslinking if the grafted polymer is crosslinked, and release the grafted dimer acid from the polymer. The degraded material of the polymer chains of the grafted polymer can flow back as part of a flow back fluid, whereas the released dimer acid can then act as a fines control agent, a proppant consolidation agent, or formation sand consolidation agent. Such an agglomerating agent can remain in a treatment zone of a subterranean formation and help anchor loose proppant, formation sand, or fines in position to prevent its migration or production during subsequent fluid production from the treatment zone of the subterranean formation.

In an embodiment, a fluid is provided, wherein the fluid comprises: (A) an aqueous phase; and (B) a dimer acid grafted polymer, wherein the dimer acid grafted polymer is at least sparingly soluble in water, wherein the polymer is dispersed, hydrated, or dissolved in the aqueous phase. In a further embodiment, the dimer acid grafted polymer is at least soluble in water.

This disclosure also provides various methods of using such a grafted polymer in various types well completion operations or treatments, including, for example, proppant treatments (that is, hydraulic fracturing), gravel packing treatments, and frac-packing treatments.

The water-soluble polymer onto which the dimer acid is grafted can be any water-soluble polymer having appropriate functional groups onto which a dimer acid can be grafted. The polymer onto which the dimer acid is grafted can be selected from the group consisting of polysaccharides and synthetic polymers. Examples of natural water-soluble polymers include guar, guar derivatives, and cellulose derivatives. Examples of synthetic water-soluble polymers include polyacrylamide and derivatives, polyacrylate and its derivatives, and polyacrylamide polyacrylate copolymer and derivatives.

The grafted polymer can optionally have crosslinkable groups. Such a grafted polymer can be represented as follows:

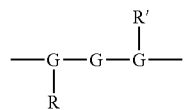

where G is a monomeric unit of a polymer, where the monomeric units can be the same or include two or more different monomeric units, R is a hydrophobic dimer acid, and, if optionally included, R' is OH, COOH, a phosphate group, or an inorganic salt of any of the foregoing.

Dimer acids are also known as dimerized fatty acids. Dimer acids are dicarboxylic acids. Dimer acids can be prepared by dimerizing unsaturated fatty acids. The unsaturated fatty acids can have, for example, from 6 to about 22 carbon atoms. Preferably, the fatty acids of the dimer acid have from 6 to 18 carbon atoms. The fatty acids of the dimerized fatty acid can be the same or a mixture of two or more different fatty acids.

Dimer acids are gooey or sticky, which property can make them useful as a tackifying agent in subterranean applications. A dimer acid can act as a tackifier for agglomerating particulates. Dimer acids, being formed of naturally-occurring unsaturated fatty acids, are non-toxic.

A common dimer acid is obtained from tall oil, which can be dimerzied, for example, on clay catalysts. The CAS number of this particular dimer acid material is [61788-89-4]. This dimer acid usually contains predominantly a dimer of stearic acid. It is also called C36 dimer acid. This dimer acid is a light yellow or yellow viscous transparent liquid.

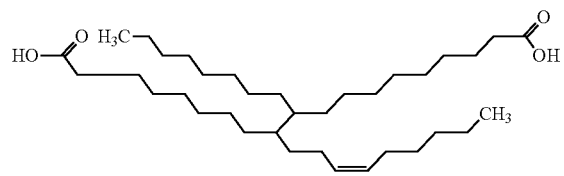 [SMILES: CCCCC/C=C\CCC(CCCCCCCC(=O)O)C(CCCCCCCC)CCCCCCCCC(=O)O]

An Example of a Dimer Acid

Dimer acids can be used for synthesis of polyamide resins, which have use as tackifying agents.

The presence of the dimer acid groups grafted on the polymer will tend to increase the viscosity of an aqueous phase in which such a modified polymer is dissolved or hydrated due to the associated behavior between the hydrophobic groups, especially with the aid of a surfactant in the aqueous phase.

The water-soluble polymer should have nucleophilic groups such as OH, amine, amide groups for facilitating the grafting of dimer acid onto the polymer, for example, by reacting such groups with an epihalohydrin and then subsequently grafting a dimer acid. Examples of polymers that have such nucleophilic groups include, without limitation, polysaccharides and polysaccharide derivatives such as guar, guar derivatives, cellulose derivatives, polyacrylamide, and polyacrylate. Such groups are also hydrophilic, which can contribute to the water-solubility or hydratability of a polymer, otherwise a polymer may be overall hydrophobic.

In an example embodiment, the dimer acid group can be attached to the monomeric units of the polymer through hydroxyl groups. The degree of dimer acid substitution based on the number of monomeric units in the polymer can be in any practical ranges. Preferably, the degree of substation is less than would cause the grafted polymer to be less than water soluble. In an embodiment, the degree of dimer acid grafting onto the polymer is preferably up to about 20 mole % (dimer acid:monomeric unit), and more preferably up to about 15 mole %. Alternatively, the degree of substitution of dimer acid on the polymer can be expressed as being in the range of about 1% to about 5% by weight of the polymer in the case of a polysaccharide. The dimer acid R group can be attached by reacting polysaccharide with epihalohydrin followed by reacting with dimer acid, as shown in FIG. 1. Addition of amine base as a catalyst may speed up the rate of chemical reaction.

In an embodiment, the phosphate group can have the formula of:

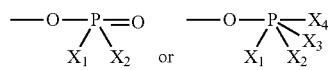

where each of the $X_1$, $X_2$, $X_3$, and $X_4$ can be the same or different and can be selected from the group consisting of:

ONa, OH, halide, or OG', where G' is another monomeric unit of another polymer molecule to provide crosslinking for the modified polymer.

In an example embodiment according to the disclosure, methods of treating proppant and formation particulates comprise: (a) providing a treatment fluid containing a dimer acid grafted polysaccharide and a proppant; (b) introducing the treatment fluid into a treatment zone of a subterranean formation at a rate to generate pressure above the fracture pressure of the formation and create or extend at least one fracture, and (c) allowing or causing the treatment fluid to break in the treatment zone to release the dimer acid in situ, whereby proppant or other particulate in the formation can be agglomerated and stabilized.

In other embodiments, similar methods as described above are applied in gravel packing or frac-packing treatments.

The disclosure provides methods that avoid the need for performing a separate remedial consolidation treatment after the use of a viscosified treatment fluid. A fluid comprising a dimer acid grafter polymer according to this disclosure provides for the release of a dimer acid upon breaking of the grafted polymer.

The new carrier fluid allows polymeric residues to be removed from the propped fracture to minimize any potential damage to the formation matrix, proppant pack, or gravel pack.

The disclosure provides a method of generating an agglomerating agent in-situ in a treatment zone as part of downhole treatment such as hydraulic fracturing, gravel packing, or frac-packing treatments.

The various fluids according to this disclosure can be applicable, for example, in hydraulic fracturing, gravel packing, or frac-packing treatments.

A benefit of the methods according to this disclosure is that the particulate stabilization function of the grafted polymer can be combined with proppant or gravel transport functions of a polymer during introducing such a treatment fluid into a treatment zone of a well.

Aqueous Phase of Treatment Fluid

Preferably, the treatment fluid comprises an aqueous phase, wherein the grafter polymer is dispersed, hydrated, or dissolved in the aqueous phase. More preferably, the grafted polymer is hydrated or dissolved in the aqueous phase. In various embodiments or preferably, the aqueous phase is the continuous phase of the fluid.

The aqueous phase can optionally include one or more dissolved inorganic salts, for example, KCl. The aqueous phase of the fluid can optionally include seawater or a brine.

Optional Surfactant

One or more surfactants can be used to help control the tackiness of the grafted polymer that may be imparted by the dimer acid group. The surfactants can be diluted or flowed back after the dimer acid is released from the polymer, allowing the dimer acid to become tacky for agglomerating particulates in a subterranean formation.

Any surfactant compatible with the dimer acid grafter polymer and capable of facilitating the coating of the polymer or dimer acid on the subterranean particles and aiding the treatment fluid in flowing to the contact points between adjacent particulates in the formation may be optionally included according to the present disclosure.

Such surfactants include, but are not limited to, ethoxylated nonyl phenol phosphate esters, mixtures of one or more cationic surfactants, one or more non-ionic surfactants, and an alkyl phosphonate surfactant. Suitable mixtures of one or more cationic and nonionic surfactants are described in U.S. Pat. No. 6,311,773 issued to Todd et al. on Nov. 6, 2001. A C12-C22 alkyl phosphonate surfactant is an example. The inclusion of a cationic surfactant is preferred.

In embodiments in which a surfactant is included, the one or more surfactants can be present in the treatment fluid in a concentration sufficient to prevent incompatibility with formation fluids, other treatment fluids, or well bore fluids. In an embodiment where liquid surfactants are used, the surfactants are generally present in a concentration in the range of from about 0.01% to about 15% by volume of the aqueous phase of the treatment fluid. In one embodiment, the liquid surfactants are present in a concentration in the range of from about 0.1% to about 5.0% by volume of the aqueous phase of the treatment fluid. In embodiments where powdered surfactants are used, the surfactants may be present in a concentration in the range of from about 0.001% to about 0.5% by weight of the aqueous phase of the treatment fluid.

Optional Silane Coupling Agent for Use with the Dimer Acid

A silane coupling agent may be used, among other things, to act as a mediator to help bond the dimer acid to the formation particulate surfaces. Examples of silane coupling agents that can be utilized include, but are not limited to, n-2-(aminoethyl)-3-aminopropyltrimethoxysilane, 3-glycidoxypropyltrimethoxysilane, and n-beta-(aminoethyl)-gamma-aminopropyl trimethoxysilane. The silane coupling agent used is included in the fluid in an amount capable of sufficiently bonding the released dimer acid to particulates, such as a proppant, gravel, or formation fines. In some embodiments of the disclosure, the silane coupling agent used is included in the range of from about 0.01% to about 3% by weight of the grafted polymer.

Treatment Zone

In various embodiments according the invention, the treatment zone can be an unconsolidated or weakly consolidated subterranean formation. Preferably, the treatment zone is in a subterranean formation having loose particulate of silicon dioxide such as sand or quartz particles. For example, the subterranean formation can be a sandstone formation. Preferably, the sandstone formation has at least 70% sandstone material by weight.

The subterranean formation can be, for example, a gas reservoir having a permeability of greater than about 0.01 mD. By way of another example, the subterranean formation can be an oil reservoir having a permeability of greater than about 20 mD. Typically, a subterranean formation has a permeability of less than about 1 Darcy.

Optional Use of Mechanical Sand Control Device

The methods of the invention can optionally include positioning a mechanical sand control device in the treatment zone. Preferably, the mechanical sand control device is selected from the group consisting of: a perforated liner, a slotted pipe, a wire-wrapped screen, a non-expandable screen, and an expandable screen.

In addition, the mechanical sand control device can optionally be gravel packed.

Optional Steps

Preferably, the treatment zone and job conditions are selected such that the design temperature is in the range of about 60° C. to about 260° C.

The step of introducing the treatment fluid can be performed either before, during, or after a sand screen installation or gravel packing are completed. It is beneficial to provide a method that transforms small formation sand or fines into larger aggregates. Preferably, this does not reduce permeability of the formation, and the permeability may be increased. This enhances the retention of fines behind the screen without plugging or eroding it.

After the step of introducing a treatment fluid according to the disclosure, the zone is shut in to allow time for the polymeric material to break in the well under the design conditions. This preferably occurs with time under the temperature, pressure, and other conditions in the zone.

The method can include the step of: after the steps of shutting in and installing the mechanical sand control device, producing fluid from the subterranean formation through the mechanical sand control device.

Preferably, the step of shutting in is for at least a sufficient time for at least 50% by weight of the grafted polymer to degrade in the treatment zone under the design conditions.

The methods according to the disclosure can stabilize the formation particulates of sand and fines by agglomerating the particulates in the formation, thereby preventing the fines from migrating. It is believed that the agglomeration does not substantially reduce the permeability of the subterranean formation or damage the subterranean formation.

The term "regain permeability" refers to the percentage of permeability of a portion of a subterranean formation following treatment; that is, it is a percentage of the post-treatment permeability as compared to the pre-treatment permeability. In some embodiments, the methods of the present disclosure are expected to be able to achieve a regain permeability of at least about 90%.

The methods of the present disclosure are capable of substantially stabilizing the particulates such that loose or weakly consolidated particulates are prevented from shifting or migrating once the treatment is complete. This is particularly significant in the context of portions of formations where it is desirable to control the particulates without having to use a gravel pack. In such situations, the methods of the present disclosure including the use of a screen or liner (which may be an expandable or traditional screen or a perforated or slotted liner, or any similar device known in the art) can act to control particulates to a sufficiently high degree that a gravel pack becomes unnecessary.

Drilling or Treatment Applications

In some embodiments of the methods of the present disclosure, a well bore is drilled with a drilling composition comprising a drilling fluid and a consolidating material. The consolidating material is allowed to penetrate into the formation and substantially cure, thus consolidating the formation sands along the wall of the well bore. The methods of the present disclosure provide, inter alia, a means for stabilizing weakly consolidated formations surrounding a well bore during drilling, preventing the formation from collapsing during production, and producing through the treated interval.

Drilling fluids suitable or use in the present disclosure may be water-based fluids or oil-based invert emulsion fluids. Essentially any drilling fluid suitable for a drilling application may be used in accordance with the present disclosure, including aqueous gels, emulsions, and other suitable fluids. Suitable aqueous gels are generally comprised of water and one or more gelling agents and can optionally further comprise weighting agents. Suitable emulsions may be comprised of two immiscible liquids such as an aqueous gelled liquid and a liquefied, normally gaseous fluid, such as nitrogen. In some embodiments of the present disclosure where the well bore is drilled into a producing zone, the drilling fluid may comprise a drill-in fluid, which is a fluid designed specifically for drilling through the reservoir section of a well bore. Drill-in fluids are often used, inter alia, to minimize damage and maximize production of exposed zones and to facilitate later well completion procedures. Often, additives essential for fluid loss control and cuttings carrying are present in a drill-in fluid. It is within the ability of one skilled in the art, with the benefit of this disclosure, to select a drilling fluid suitable for use in the drilling compositions of the present disclosure.

Traditional drilling operations add solid particulate matter to the drilling fluid to help control fluid loss to the surrounding formation. In the methods of the present disclosure, use of such additives can be greatly reduced or eliminated due to the fact that the consolidation material added to the drilling fluid may act as a fluid loss control agent. Thus, drilling compositions suitable for use in the present disclosure preferably comprise only a small amount of particulate fluid loss control material. In some embodiments of the present disclosure, particularly in those applications where the formation being drilled has a low permeability, e.g. a chalk formation, the drilling fluid composition may contain little if any particulate fluid loss control material. In other embodiments of the present disclosure, a fluid loss control material is present in the drilling fluid composition in an amount ranging from 0.1% to about 10% by weight of the overall drilling fluid composition. When used, the particulate fluid loss control material is preferably a material that will degrade in the well bore. Suitable such degradable fluid loss control material's include, but are not limited to, aliphatic polyesters, polylactic acid, poly(lactides), poly(orthoesters) and combinations thereof.

Thus, according to the methods of the present disclosure, which include the use of a treatment fluid comprising a dimer acid polymer and, optionally, a screen or liner, the method creates a stable, permeable region around the wellbore that resists particulate migration. The screen or liner can be used, for example, to provide mechanical support to prevent borehole collapse. Such embodiments may make the use of screen-only or liner-only (no gravel pack) completions functional over a much wider range of formation properties than previously thought possible.

In addition, the methods can be used as a remedial treatment to be injected into a treatment zone through a proppant or gravel pack of a previously performed fracturing treatment or gravel pack.

The methods can be performed in vertical, inclined, or horizontal wellbores, and in open-hole or under-reamed completions as well as in cased wells. If the method is to be carried out in a cased wellbore, the casing is perforated to provide for fluid communication with a zone of interest in the subterranean formation.

The method can optionally include the step of: before or after the step of introducing the treatment fluid, introducing a fracturing fluid into the wellbore at a pressure sufficient to create at least one fracture in the subterranean formation. For example, the composition can be used as a prior treatment to hydraulic fracturing.

These and other embodiments of the disclosure will be apparent to one skilled in the art upon reading the following detailed description. While the disclosure is susceptible to various modifications and alternative forms, specific embodiments thereof will be described in detail and shown by way of example. It should be understood, however, that it is not intended to limit the disclosure to the particular forms disclosed.

BRIEF DESCRIPTION OF THE DRAWING

The accompanying drawing is incorporated into the specification to help illustrate examples according to a presently preferred embodiment of the disclosure.

FIG. 1 illustrates an example of grafting a dimer acid group onto a polymer having hydroxyl groups by reacting the polymer with epihalohydrin followed by reacting with dimer acid.

DETAILED DESCRIPTION OF PRESENTLY PREFERRED EMBODIMENTS AND BEST MODE

Definitions and Usages

General Interpretation

The words or terms used herein have their plain, ordinary meaning in the field of this disclosure, except to the extent explicitly and clearly defined in this disclosure or unless the specific context otherwise requires a different meaning.

The words "comprising," "containing," "including," "having," and all grammatical variations thereof are intended to have an open, non-limiting meaning. For example, a composition comprising a component does not exclude it from having additional components, an apparatus comprising a part does not exclude it from having additional parts, and a method having a step does not exclude it having additional steps. When such terms are used, the compositions, apparatuses, and methods that "consist essentially of" or "consist of" the specified components, parts, and steps are specifically included and disclosed. As used herein, the words "consisting essentially of," and all grammatical variations thereof are intended to limit the scope of a claim to the specified materials or steps and those that do not materially affect the basic and novel characteristic(s) of the claimed invention.

The indefinite articles "a" or "an" mean one or more than one of the component, part, or step that the article introduces.

Whenever a numerical range of degree or measurement with a lower limit and an upper limit is disclosed, any number and any range falling within the range is also intended to be specifically disclosed. For example, every range of values (in the form "from a to b," or "from about a to about b," or "from about a to b," "from approximately a to b," and any similar expressions, where "a" and "b" represent numerical values of degree or measurement) is to be understood to set forth every number and range encompassed within the broader range of values.

It should be understood that algebraic variables and other scientific symbols used herein are selected arbitrarily or according to convention. Other algebraic variables can be used.

Oil and Gas Reservoirs

In the context of production from a well, "oil" and "gas" are understood to refer to crude oil and natural gas, respectively. Oil and gas are naturally occurring hydrocarbons in certain subterranean formations.

A "subterranean formation" is a body of rock that has sufficiently distinctive characteristics and is sufficiently continuous for geologists to describe, map, and name A subterranean formation having a sufficient porosity and permeability to store and transmit fluids is sometimes referred to as a "reservoir."

A subterranean formation containing oil or gas may be located under land or under the seabed off shore. Oil and gas reservoirs are typically located in the range of a few hundred feet (shallow reservoirs) to a few tens of thousands of feet (ultra-deep reservoirs) below the surface of the land or seabed.

In geology, rock or stone is a naturally occurring solid aggregate of minerals or mineraloids. The Earth's outer solid layer, the lithosphere, is made of rock. Three major groups of rocks are igneous, sedimentary, and metamorphic. The vast majority of reservoir rocks are sedimentary rocks, but highly fractured igneous and metamorphic rocks can sometimes be reservoirs.

A consolidated formation is a geologic material for which the particles are stratified (layered), cemented, or firmly packed together (hard rock); usually occurring at a depth below the ground surface. An unconsolidated formation is a sediment that is loosely arranged or unstratified (not in layers) or whose particles are not cemented together (soft rock); occurring either at the ground surface or at a depth below the surface. In an unconsolidated or weakly consolidated formation, some particulates are insufficiently bonded in the formation to withstand the forces produced by the production or flowback of fluids through the matrix of the formation.

As used herein, a subterranean formation having greater than about 50% by weight of inorganic siliceous materials (e.g., sandstone) is referred to as a "sandstone formation."

There are conventional and non-conventional types of reservoirs. In a conventional reservoir, the hydrocarbons flow to the wellbore in a manner that can be characterized by flow through permeable media, where the permeability may or may not have been altered near the wellbore, or flow through permeable media to a permeable (conductive), bi-wing fracture placed in the formation. A conventional reservoir would typically have a permeability greater than about 1 milliDarcy (equivalent to about 1,000 microDarcy).

Well Servicing

To produce oil or gas from a reservoir, a wellbore is drilled into a subterranean formation, which may be the reservoir or adjacent to the reservoir.

Generally, well services include a wide variety of operations that may be performed in oil, gas, geothermal, or water wells, such as drilling, cementing, completion, and intervention. Well services are designed to facilitate or enhance the production of desirable fluids such as oil or gas from or through a subterranean formation. A well service usually involves introducing a fluid into a well.

Drilling, completion, and intervention operations can include various types of treatments that are commonly performed on a well or subterranean formation. During completion or intervention, stimulation is a type of treatment performed to enhance or restore the productivity of oil and gas from a well. Stimulation treatments fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Other types of completion or intervention treatments can include, for example, gravel packing, consolidation, and controlling excessive water production.

Wells and Fluids

A "well" includes a wellhead and at least one wellbore from the wellhead penetrating the earth. The "wellhead" is the surface termination of a wellbore, which surface may be on land or on a seabed.

A "well site" is the geographical location of a wellhead of a well. It may include related facilities, such as a tank battery, separators, compressor stations, heating or other equipment, and fluid pits. If offshore, a well site can include a platform.

The "wellbore" refers to the drilled hole, including any cased or uncased portions of the well or any other tubulars in the well. A wellbore can have portions that are vertical, horizontal, or anything in between, and it can have portions that are straight, curved, or branched. As used herein, "uphole,"

"downhole," and similar terms are relative to the direction of the wellhead, regardless of whether a wellbore portion is vertical or horizontal.

A wellbore can be used as a production or injection wellbore. A production wellbore is used to produce hydrocarbons from the reservoir. An injection wellbore is used to inject a fluid, for example, liquid water or steam, to drive oil or gas to a production wellbore.

As used herein, introducing "into a well" means introducing at least into and through the wellhead. According to various techniques known in the art, tubulars, equipment, tools, or fluids can be directed from the wellhead into any desired portion of the wellbore.

As used herein, the term "annulus" means the space between two generally cylindrical objects, one inside the other. The objects can be concentric or eccentric. Without limitation, one of the objects can be a tubular and the other object can be an enclosed conduit. The enclosed conduit can be a wellbore or borehole or it can be another tubular. The following are some non-limiting examples illustrating some situations in which an annulus can exist. Referring to an oil, gas, or water well, in an open hole well, the space between the outside of a tubing string and the borehole of the wellbore is an annulus. In a cased hole, the space between the outside of the casing and the borehole is an annulus. In addition, in a cased hole there may be an annulus between the outside cylindrical portion of a tubular such as a production tubing string and the inside cylindrical portion of the casing. An annulus can be a space through which a fluid can flow or it can be filled with a material or object that blocks fluid flow, such as a packing element. Unless otherwise clear from the context, as used herein an "annulus" is a space through which a fluid can flow.

As used herein, the word "tubular" means any kind of structural body in the general form of a tube. Examples of tubulars in oil wells include, but are not limited to, a drill pipe, a casing, a tubing string, a coil tubing, a line pipe, and a transportation pipe.

As used herein, unless the context otherwise requires, a treatment fluid refers to the specific properties and composition of a fluid at the time the fluid is being introduced into a well. In addition, it should be understood that, during the course of a well operation such as drilling, cementing, completion, or intervention, or during a specific treatment, the specific properties and composition of a type of fluid can be varied or several different types of fluids can be used.

For example, the compositions can be varied to adjust viscosity or elasticity of the fluids to accommodate changes in the concentrations of particulate to be carried downhole. It can also be desirable to accommodate expected changes in temperatures encountered by the fluids during the course of the treatment. By way of another example, it can be desirable to accommodate the longer duration that an earlier-introduced treatment fluid may need to maintain viscosity before breaking compared to the shorter duration that a later-introduced treatment fluid may need to maintain viscosity before breaking. Changes in concentration of a particulate, viscosity-increasing agent, breaker, or other additives in the various treatment fluids of a treatment operation can be made in stepped changes of concentrations or ramped changes of concentrations.

As used herein, the word "treatment" refers to any treatment for changing a condition of a portion of a wellbore or a subterranean formation adjacent a wellbore; however, the word "treatment" does not necessarily imply any particular treatment purpose. A treatment usually involves introducing a fluid for the treatment, in which case it may be referred to as a treatment fluid, into a well. As used herein, a "treatment fluid" is a fluid used in a treatment. The word "treatment" in the term "treatment fluid" does not necessarily imply any particular treatment or action by the fluid.

In the context of a well or wellbore, a "portion" or "interval" refers to any downhole portion or interval along the length of a wellbore.

A "zone" refers to an interval of rock along a wellbore that is differentiated from uphole and downhole zones based on hydrocarbon content or other features, such as permeability, composition, perforations, or other fluid communication with the wellbore, faults, or fractures. A zone of a wellbore that penetrates a hydrocarbon-bearing zone that is capable of producing hydrocarbon is referred to as a "production zone." A "treatment zone" refers to an interval of rock along a wellbore into which a fluid is directed to flow from the wellbore. As used herein, "into a treatment zone" means into and through the wellhead and, additionally, through the wellbore and into the treatment zone.

The term "damage" as used herein regarding a subterranean formation refers to undesirable deposits in a subterranean formation that may reduce its permeability. Scale, skin, gel residue, and hydrates are contemplated by this term.

The term "sand control device" is used generically herein and is meant to include and cover all types of similar structures which are commonly used in gravel pack well completions which permit flow of fluids through the "screen" while blocking the flow of particulates (e.g., commercially-available screens; slotted or perforated liners or pipes; sintered-metal screens; sintered-sized, mesh screens; screened pipes; pre-packed screens, radially-expandable screens and/or liners; or combinations thereof).

Generally, the greater the depth of the formation, the higher the static temperature and pressure of the formation. Initially, the static pressure equals the initial pressure in the formation before production. After production begins, the static pressure approaches the average reservoir pressure.

A "design" refers to the estimate or measure of one or more parameters planned or expected for a particular fluid or stage of a well service or treatment. For example, a fluid can be designed to have components that provide a minimum density or viscosity for at least a specified time under expected downhole conditions. A well service may include design parameters such as fluid volume to be pumped, required pumping time for a treatment, or the shear conditions of the pumping.

The term "design temperature" refers to an estimate or measurement of the actual temperature at the downhole environment during the time of a treatment. For example, the design temperature for a well treatment takes into account not only the bottom hole static temperature ("BHST"), but also the effect of the temperature of the fluid on the BHST during treatment. The design temperature for a fluid is sometimes referred to as the bottom hole circulation temperature ("BHCT"). Because fluids may be considerably cooler than BHST, the difference between the two temperatures can be quite large. Ultimately, if left undisturbed a subterranean formation will return to the BHST.

Permeability

Permeability refers to how easily fluids can flow through a material. For example, if the permeability is high, then fluids will flow more easily and more quickly through the material. If the permeability is low, then fluids will flow less easily and more slowly through the material. As used herein, unless otherwise specified, permeability is measured with light oil having an API gravity of greater than 31.1 degrees.

For gas wells, "high permeability" means the matrix of a subterranean formation has a permeability of at least 10 millidarcy (mD) and "low permeability" means the matrix has a permeability of less than 1 mD. For oil wells, "high permeability" means the matrix of a subterranean formation has a permeability of at least 30 mD and "low permeability" means the matrix has a permeability of less than 10 mD. For gravel packing, "high permeability" means the matrix of a subterranean formation has a permeability of at least 500 mD and "low permeability" means the matrix has a permeability of less than 50 mD.

Substances, Chemicals, and Derivatives

A substance can be a pure chemical or a mixture of two or more different chemicals. A pure chemical is a sample of matter that cannot be separated into simpler components without chemical change.

As used herein, unless the context otherwise requires, a "polymer" or "polymeric material" includes homopolymers, copolymers, terpolymers, etc. In addition, the term "copolymer" as used herein is not limited to the combination of polymers having two monomeric units, but includes any combination of monomeric units, for example, terpolymers, tetrapolymers, etc.

As used herein, "modified" or "derivative" means a chemical compound formed by a chemical process from a parent compound, wherein the chemical backbone skeleton of the parent compound is retained in the derivative. The chemical process preferably includes at most a few chemical reaction steps, and more preferably only one or two chemical reaction steps. As used herein, a "chemical reaction step" is a chemical reaction between two chemical reactant species to produce at least one chemically different species from the reactants (regardless of the number of transient chemical species that may be formed during the reaction). An example of a chemical step is a substitution reaction. Substitution on the reactive sites of a polymeric material may be partial or complete.

Phases and Physical States

As used herein, "phase" is used to refer to a substance having a chemical composition and physical state that is distinguishable from an adjacent phase of a substance having a different chemical composition or a different physical state.

As used herein, if not other otherwise specifically stated, the physical state or phase of a substance (or mixture of substances) and other physical properties are determined at a temperature of 77° F. (25° C.) and a pressure of 1 atmosphere (Standard Laboratory Conditions) without applied shear.

Particles and Particulates

As used herein, a "particle" refers to a body having a finite mass and sufficient cohesion such that it can be considered as an entity but having relatively small dimensions. A particle can be of any size ranging from molecular scale to macroscopic, depending on context.

As used herein, particulate or particulate material refers to matter in the physical form of distinct particles in a solid or liquid state (which means such an association of a few atoms or molecules). As used herein, a particulate is a grouping of particles having similar chemical composition and particle size ranges anywhere in the range of about 0.5 micrometer (500 nm), for example, microscopic clay particles, to about 3 millimeters, for example, large grains of sand.

A particulate can be of solid or liquid particles. As used herein, however, unless the context otherwise requires, particulate refers to a solid particulate.

It should be understood that the terms "particle" and "particulate," includes all known shapes of particles including substantially rounded, spherical, oblong, ellipsoid, rod-like, fiber, polyhedral (such as cubic materials), etc., and mixtures thereof. For example, the term "particulate" as used herein is intended to include solid particles having the physical shape of platelets, shavings, flakes, ribbons, rods, strips, spheroids, toroids, pellets, tablets or any other physical shape.

As used herein, a fiber is a particle or grouping of particles having an aspect ratio L/D greater than 5/1.

A particulate will have a particle size distribution ("PSD"). As used herein, "the size" of a particulate can be determined by methods known to persons skilled in the art.

One way to measure the approximate particle size distribution of a solid particulate is with graded screens. A solid particulate material will pass through some specific mesh (that is, have a maximum size; larger pieces will not fit through this mesh) but will be retained by some specific tighter mesh (that is, a minimum size; pieces smaller than this will pass through the mesh). This type of description establishes a range of particle sizes. A "+" before the mesh size indicates the particles are retained by the sieve, while a "−" before the mesh size indicates the particles pass through the sieve. For example, −70/+140 means that 90% or more of the particles will have mesh sizes between the two values.

Particulate materials are sometimes described by a single mesh size, for example, 100 U.S. Standard mesh. If not otherwise stated, a reference to a single particle size means about the mid-point of the industry-accepted mesh size range for the particulate.

Dispersions and Solutions

A dispersion is a system in which particles of a substance of one chemical composition and physical state are dispersed in another substance of a different chemical composition or physical state. In addition, phases can be nested. If a substance has more than one phase, the most external phase is referred to as the continuous phase of the substance as a whole, regardless of the number of different internal phases or nested phases.

A dispersion can be classified in different ways, including, for example, based on the size of the dispersed particles, the uniformity or lack of uniformity of the dispersion, and, if a fluid, by whether or not precipitation occurs.

A dispersion is considered to be heterogeneous if the dispersed particles are not dissolved and are greater than about 1 nanometer in size. (For reference, the diameter of a molecule of toluene is about 1 nm and a molecule of water is about 0.3 nm).

Heterogeneous dispersions can have gas, liquid, or solid as an external phase. For example, in a case where the dispersed-phase particles are liquid in an external phase that is another liquid, this kind of heterogeneous dispersion is more particularly referred to as an emulsion. A solid dispersed phase in a continuous liquid phase is referred to as a sol, suspension, or slurry, partly depending on the size of the dispersed solid particulate.

A dispersion is considered to be homogeneous if the dispersed particles are dissolved in solution or the particles are less than about 1 nanometer in size. Even if not dissolved, a dispersion is considered to be homogeneous if the dispersed particles are less than about 1 nanometer in size.

A solution is a special type of homogeneous mixture. A solution is considered homogeneous: (a) because the ratio of solute to solvent is the same throughout the solution; and (b) because solute will never settle out of solution, even under powerful centrifugation, which is due to intermolecular attraction between the solvent and the solute. An aqueous solution, for example, saltwater, is a homogenous solution in which water is the solvent and salt is the solute.

One may also refer to the solvated state, in which a solute ion or molecule is complexed by solvent molecules. A chemical that is dissolved in solution is in a solvated state. The solvated state is distinct from dissolution and solubility. Dissolution is a kinetic process, and is quantified by its rate. Solubility quantifies the concentration of the solute at which there is dynamic equilibrium between the rate of dissolution and the rate of precipitation of the solute. Dissolution and solubility can be dependent on temperature and pressure, and may be dependent on other factors, such as salinity or pH of an aqueous phase.

Hydratability or Solubility

As referred to herein, "hydratable" means capable of being hydrated by contacting the hydratable material with water. Regarding a hydratable material that includes a polymer, this means, among other things, to associate sites on the polymer with water molecules and to unravel and extend the polymer chain in the water.

The term "solution" is intended to include not only true molecular solutions but also dispersions of a polymer wherein the polymer is so highly hydrated as to cause the dispersion to be visually clear and having essentially no particulate matter visible to the unaided eye. The term "soluble" is intended to have a meaning consistent with these meanings of solution.

A substance is considered to be "soluble" in a liquid if at least 10 grams of the substance can be hydrated or dissolved in one liter of the liquid when tested at 77° F. and 1 atmosphere pressure for 2 hours, considered to be "insoluble" if less than 1 gram per liter, and considered to be "sparingly soluble" for intermediate solubility values.

As will be appreciated by a person of skill in the art, the hydratability, dispersibility, or solubility of a substance in water can be dependent on the salinity, pH, or other substances in the water. Accordingly, the salinity, pH, and additive selection of the water can be modified to facilitate the hydratability, dispersibility, or solubility of a substance in aqueous solution. To the extent not specified, the hydratability, dispersibility, or solubility of a substance in water is determined in deionized water, at neutral pH, and without any other additives.

The "source" of a chemical species in a solution or in a fluid composition can be a material or substance that is itself the chemical species, or that makes the chemical species chemically available immediately, or it can be a material or substance that gradually or later releases the chemical species to become chemically available in the solution or the fluid.

Fluids

A fluid can be a homogeneous or heterogeneous. In general, a fluid is an amorphous substance that is or has a continuous phase of particles that are smaller than about 1 micrometer that tends to flow and to conform to the outline of its container.

Every fluid inherently has at least a continuous phase. A fluid can have more than one phase. The continuous phase of a treatment fluid is a liquid under Standard Laboratory Conditions.

The term "water" is used generally herein to include fresh water or brine, unless the context otherwise requires.

As used herein, the term "brine" is intended to include, unless the context otherwise requires, any aqueous solution having greater than 1,000 ppm total dissolved inorganic salts. Oil field brines commonly contain varying concentrations of inorganic salts, e.g., sodium chloride, calcium chloride, and magnesium salts. Aqueous solutions are frequently modified by addition of potassium chloride to stabilize the subsurface clay. Accordingly, potassium chloride is frequently encountered in brines.

As used herein, the term "hard brine" is intended to include, unless the context otherwise requires, any aqueous solution having greater than 1,000 ppm total dissolved divalent inorganic salts, such as magnesium or calcium. For example, a hard brine can have about 1,000 ppm to about 16,000 ppm divalent cations such calcium ions.

As used herein, a "water-based" fluid means that water or an aqueous solution is the dominant material of the continuous phase, that is, greater than 50% by weight, of the continuous phase of the fluid based on the combined weight of water and any other solvents in the phase (that is, excluding the weight of any dissolved solids).

In contrast, an "oil-based" fluid means that oil is the dominant material by weight of the continuous phase of the fluid. In this context, the oil of an oil-based fluid can be any oil.

Apparent Viscosity of a Fluid

Viscosity is a measure of the resistance of a fluid to flow. In everyday terms, viscosity is "thickness" or "internal friction." Therefore, pure water is "thin," having a relatively low viscosity whereas honey is "thick," having a relatively higher viscosity. Put simply, the less viscous the fluid is, the greater its ease of movement (fluidity). More precisely, viscosity is defined as the ratio of shear stress to shear rate.

Most fluids are non-Newtonian fluids. Accordingly, the apparent viscosity of a fluid applies only under a particular set of conditions including shear stress versus shear rate, which must be specified or understood from the context. As used herein, a reference to viscosity is actually a reference to an apparent viscosity. Apparent viscosity is commonly expressed in units of mPa·s or centipoise (cP), which are equivalent.

Gels and Deformation

Technically, a "gel" is a semi-solid, jelly-like physical state or phase that can have properties ranging from soft and weak to hard and tough. Shearing stresses below a certain finite value fail to produce permanent deformation. The minimum shear stress which will produce permanent deformation is referred to as the shear strength or gel strength of the gel.

The physical state of a gel is formed by a network of interconnected molecules, such as a crosslinked polymer or a network of micelles in a continuous liquid phase. The network gives a gel phase its structure and an apparent yield point. At the molecular level, a gel is a dispersion in which both the network of molecules is continuous and the liquid is continuous. A gel is sometimes considered as a single phase.

A hydrogel is a gel state having a network of polymer chains that are hydrophilic and for which water is the dispersion medium. In some cases, a "hydrogel" refers to a natural or synthetic polymeric material that is a highly absorbent and that can form such a gel.

In the oil and gas industry, however, the term "gel" may be used to refer to any fluid having a viscosity-increasing agent, regardless of whether it is a viscous fluid or meets the technical definition for the physical state of a gel. A "base gel" is a term used in the field for a fluid that includes a viscosity-increasing agent, such as guar or other polymer, but that excludes crosslinking agents. Typically, a base gel is mixed with another fluid containing a crosslinker, wherein the mixture is adapted to form a crosslinked gel. Similarly, a "crosslinked gel" may refer to a substance having a viscosity-increasing agent that is crosslinked, regardless of whether it is a viscous fluid or meets the technical definition for the physical state of a gel.

As used herein, a substance referred to as a "gel" is subsumed by the concept of "fluid" if it is a pumpable fluid.

Viscosity Measurements (For Example, for Hydraulic Fracturing or Gravel Packing)

There are numerous ways of measuring and modeling viscous properties, and new developments continue to be made. The methods depend on the type of fluid for which viscosity is being measured. A typical method for quality assurance or quality control (QA/QC) purposes uses a couette device, such as a FANN™ Model 35 or Model 50 viscometer or a CHANDLER™ Model 5550 HPHT viscometer. Such a viscometer measures viscosity as a function of time, temperature, and shear rate. The viscosity-measuring instrument can be calibrated using standard viscosity silicone oils or other standard viscosity fluids.

Due to the geometry of most common viscosity-measuring devices, however, solid particulate, especially if larger than silt (larger than 74 micron), would interfere with the measurement on some types of measuring devices. Therefore, the viscosity of a fluid containing such solid particulate is usually inferred and estimated by measuring the viscosity of a test fluid that is similar to the fracturing fluid without any proppant or gravel that would otherwise be included. However, as suspended particles (which can be solid, gel, liquid, or gaseous bubbles) usually affect the viscosity of a fluid, the actual viscosity of a suspension is usually somewhat different from that of the continuous phase.

A substance is considered to be a fluid if it has an apparent viscosity less than 5,000 mPa·s (cP) (independent of any gel characteristic). For reference, the viscosity of pure water is about 1 mPa·s (cP).

As used herein, for the purposes of hydraulic fracturing a fluid is considered to be "viscous" if it has an apparent viscosity of 200 mPa·s (cP) at 40 $s^{-1}$ shear rate or higher. The viscosity of a viscous fluid is considered to break or be broken if the viscosity is greatly reduced. Preferably, although not necessarily for all applications depending on how high the initial viscosity of the fluid, the viscous fluid breaks to a viscosity of less than 50% of the viscosity of the maximum viscosity or less than 200 mPa·s (cP) at 40 $s^{-1}$ shear rate.

Historically, to be considered to be suitable for use as a carrier fluid for a proppant for conventional reservoirs or applications such as gravel packing, it has been believed that a crosslinked gel needs to exhibit sufficient viscoelastic properties, in particular relatively high viscosities (for example, at least about 300 mPa·s (cP) at a shear rate of 100 sec-1).

General Measurement Terms

Unless otherwise specified or unless the context otherwise clearly requires, any ratio or percentage means by weight.

Unless otherwise specified or unless the context otherwise clearly requires, the phrase "by weight of the water" means the weight of the water of an aqueous phase of the fluid without the weight of any viscosity-increasing agent, dissolved salt, suspended particulate, or other materials or additives that may be present in the water.

If there is any difference between U.S. or Imperial units, U.S. units are intended. For example, "GPT" or "gal/Mgal" means U.S. gallons per thousand U.S. gallons and "ppt" means pounds per thousand U.S. gallons.

Unless otherwise specified, mesh sizes are in U.S. Standard Mesh.

The micrometer (μm) may sometimes be referred to herein as a micron.

The conversion between pound per gallon (lb/gal or ppg) and kilogram per cubic meter (kg/m³) is: 1 lb/gal=(0.4536 kg/lb)×(gal/0.003785 m³)=120 kg/m³.

The conversion between pound per thousand gallons (lb/Mgal) and kilogram per cubic meter (kg/m³) is: 1 lb/Mgal=(0.4536 kg/lb)×(Mgal/3.785 m³)=0.12 kg/m³.

Drilling and Drilling Fluids

A well is created by drilling a hole into the earth (or seabed) with a drilling rig that rotates a drill string with a drilling bit attached to the downward end. Usually the borehole is anywhere between about 5 inches (13 cm) to about 36 inches (91 cm) in diameter. As upper portions are cased or lined, progressively smaller drilling strings and bits must be used to pass through the uphole casings or liners, which steps the borehole down to progressively smaller diameters.

While drilling an oil or gas well, a drilling fluid is circulated downhole through a drillpipe to a drill bit at the downhole end, out through the drill bit into the wellbore, and then back uphole to the surface through the annular path between the tubular drillpipe and the borehole. The purpose of the drilling fluid is to lubricate the drill string, maintain hydrostatic pressure in the wellbore, and carry rock cuttings out from the wellbore.

The drilling fluid can be water-based or oil-based. Oil-based fluids tend to have better lubricating properties than water-based fluids, nevertheless, other factors can mitigate in favor of using a water-based drilling fluid.

In addition, the drilling fluid may be viscosified to help suspend and carry rock cuttings out from the wellbore. Rock cuttings can range in size from silt-sized particles to chunks measured in centimeters. Carrying capacity refers to the ability of a circulating drilling fluid to transport rock cuttings out of a wellbore. Other terms for carrying capacity include hole-cleaning capacity and cuttings lifting.

An example a water-based drilling fluid is a drilling mud, which includes an aqueous solution and undissolved solids (as solid suspensions). A water-based drilling mud can be based on a brine. Both the dissolved solids and the undissolved solids can be chosen to help increase the density of the drilling fluid.

An example of an undissolved weighting agent is barite (barium sulfate). The density of a drilling mud can be much higher than that of typical seawater or even higher than high-density brines due to the presence of suspended solids.

Common Well Treatments and Treatment Fluids

Well services can include various types of treatments that are commonly performed in a wellbore or subterranean formation.

For example, a treatment for fluid-loss control can be used during any of drilling, completion, and intervention operations. During completion or intervention, stimulation is a type of treatment performed to enhance or restore the productivity of oil and gas from a well.

Well services can include various types of treatments that are commonly performed in a wellbore or subterranean formation. For example, stimulation is a type of treatment performed to enhance or restore the productivity of oil or gas from a well. Even small improvements in fluid flow can yield dramatic production results.

Stimulation treatments fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Fracturing treatments are often applied in treatment zones having poor natural permeability. Matrix treatments are often applied in treatment zones having good natural permeability to counteract damage in the near-wellbore area.

Other types of completion or intervention treatments can include, for example, gravel packing, consolidation, and controlling excessive water production. Still other types of completion or intervention treatments include, but are not limited to, damage removal, formation isolation, wellbore cleanout, scale removal, and scale control.

Hydraulic Fracturing

The purpose of a hydraulic fracturing treatment is to provide an improved flow path for oil or gas to flow from a hydrocarbon-bearing formation to the wellbore. In addition, a fracturing treatment can facilitate the flow of injected treatment fluids from the well into the formation. A treatment fluid adapted for this purpose is sometimes referred to as a fracturing fluid. The fracturing fluid is pumped at a sufficiently high flow rate and pressure into the wellbore and into the subterranean formation to create or enhance one or more fractures in the subterranean formation. Creating a fracture means making a new fracture in the formation. Enhancing a fracture means enlarging a pre-existing fracture in the formation.

A frac pump is used for hydraulic fracturing. A frac pump is a high-pressure, high-volume pump. The fracturing fluid may be pumped down into the wellbore at high rates and pressures, for example, at a flow rate in excess of 50 barrels per minute (2,100 U.S. gallons per minute) at a pressure in excess of 5,000 pounds per square inch ("psi"). The pump rate and pressure of the fracturing fluid may be even higher, for example, flow rates in excess of 100 barrels per minute and pressures in excess of 10,000 psi are often encountered.

Fracturing a subterranean formation often uses hundreds of thousands of gallons of fracturing fluid or more. Further, it is often desirable to fracture more than one treatment zone of a well. Therefore, a high volume of fracturing fluids is often used in fracturing of a well, which means that a low-cost fracturing fluid is desirable. Because of the ready availability and relative low cost of water compared to other liquids, among other considerations, a fracturing fluid is usually water-based.

The creation or extension of a fracture in hydraulic fracturing may initially occur suddenly. When this happens, the fracturing fluid suddenly has a fluid flow path through the fracture to flow more rapidly away from the wellbore. As soon as the fracture is created or enhanced, the sudden increase in the flow of fluid away from the well reduces the pressure in the well. Thus, the creation or enhancement of a fracture in the formation may be indicated by a sudden drop in fluid pressure, which can be observed at the wellhead. After initially breaking down the formation, the fracture may then propagate more slowly, at the same pressure or with little pressure increase. It can also be detected with seismic techniques.

A newly-created or newly-extended fracture will tend to close together after the pumping of the fracturing fluid is stopped. To prevent the fracture from closing, a material is usually placed in the fracture to keep the fracture propped open and to provide higher fluid conductivity than the matrix of the formation. A material used for this purpose is referred to as a proppant.

A proppant is in the form of a solid particulate, which can be suspended in the fracturing fluid, carried downhole, and deposited in the fracture to form a proppant pack. The proppant pack props the fracture in an open condition while allowing fluid flow through the permeability of the pack. The proppant pack in the fracture provides a higher-permeability flow path for the oil or gas to reach the wellbore compared to the permeability of the matrix of the surrounding subterranean formation. This higher-permeability flow path increases oil and gas production from the subterranean formation.

A particulate for use as a proppant is usually selected based on the characteristics of size range, crush strength, and solid stability in the types of fluids that are encountered or used in wells. Preferably, a proppant should not melt, dissolve, or otherwise degrade from the solid state under the downhole conditions.

The proppant is selected to be an appropriate size to prop open the fracture and bridge the fracture width expected to be created by the fracturing conditions and the fracturing fluid. If the proppant is too large, it will not easily pass into a fracture and will screenout too early. If the proppant is too small, it will not provide the fluid conductivity to enhance production. See, for example, W. J. McGuire and V. J. Sikora, "The Effect of Vertical Fractures on Well Productivity," *Trans.*, AIME (1960) 219, 401-403. In the case of fracturing relatively permeable or even tight-gas reservoirs, a proppant pack should provide higher permeability than the matrix of the formation. In the case of fracturing ultra-low permeable formations, such as shale formations, a proppant pack should provide for higher permeability than the naturally occurring fractures or other micro-fractures of the fracture complexity.

Appropriate sizes of particulate for use as a proppant are typically in the range from about 8 to about 100 U.S. Standard Mesh. A typical proppant is sand-sized, which geologically is defined as having a largest dimension ranging from about 0.06 millimeters up to about 2 millimeters (mm). (The next smaller particle size class below sand size is silt., which is defined as having a largest dimension ranging from less than about 0.06 mm down to about 0.004 mm.) As used herein, proppant does not mean or refer to suspended solids, silt, fines, or other types of insoluble solid particulate smaller than about 0.06 mm (about 230 U.S. Standard Mesh). Further, it does not mean or refer to particulates larger than about 3 mm (about 7 U.S. Standard Mesh).

The proppant is sufficiently strong, that is, has a sufficient compressive or crush resistance, to prop the fracture open without being deformed or crushed by the closure stress of the fracture in the subterranean formation. For example, for a proppant material that crushes under closure stress, a 20/40 mesh proppant preferably has an API crush strength of at least 4,000 psi closure stress based on 10% crush fines according to procedure API RP-56. A 12/20 mesh proppant material preferably has an API crush strength of at least 4,000 psi closure stress based on 16% crush fines according to procedure API RP-56. This performance is that of a medium crush-strength proppant, whereas a very high crush-strength proppant would have a crush-strength of about 10,000 psi. In comparison, for example, a 100-mesh proppant material for use in an ultra-low permeable formation such as shale preferably has an API crush strength of at least 5,000 psi closure stress based on 6% crush fines. The higher the closing pressure of the formation of the fracturing application, the higher the strength of proppant is needed. The closure stress depends on a number of factors known in the art, including the depth of the formation.

Further, a suitable proppant should be stable over time and not dissolve in fluids commonly encountered in a well environment. Preferably, a proppant material is selected that will not dissolve in water or crude oil.

Suitable proppant materials include, but are not limited to, silica sand, ground nut shells, ground fruit pits, sintered bauxite, glass, plastics, ceramic materials, processed wood, composite materials, resin coated particulates, and any combination of the foregoing. Mixtures of different kinds or sizes of proppant can be used as well.

In conventional reservoirs, a proppant commonly has a median size anywhere within the range of about 20 to about 100 U.S. Standard Mesh. For a synthetic proppant, it commonly has a median size anywhere within the range of about 8 to about 100 U.S. Standard Mesh.

The concentration of proppant in the treatment fluid depends on the nature of the subterranean formation. As the nature of subterranean formations differs widely, the concentration of proppant in the treatment fluid may be in the range of from about 0.03 kilograms to about 12 kilograms of proppant per liter of liquid phase (from about 0.1 lb/gal to about 25 lb/gal).

A resinous material can be coated on the proppant. Purposes of the coating can include improving the strength of a proppant, changing a wettability characteristic of the proppant for improving flow of oil or gas, or reducing the migration of a particulate in the formation that is smaller than the proppant, which can plug pores in the formation or proppant pack, decrease production, or cause abrasive damage to wellbore pumps, tubing, and other equipment.

The term "coated" does not imply any particular degree of coverage on the proppant particulates, which coverage can be partial or complete.

As used herein, the term "resinous material" means a material that is a viscous liquid and has a sticky or tacky characteristic when tested under Standard Laboratory Conditions. A resinous material can include a resin, a tackifying agent, and any combination thereof in any proportion. The resin can be or include a curable resin.

For example, some or all of the proppant can be coated with a curable resin. The curable resin can be allowed to cure on the proppant prior to the proppant being introduced into the well. The cured resin coating on the proppant provides a protective shell encapsulating the proppant and keeping the fine particulates in place if the proppant was crushed or provides a different wettable surface than the proppant without the coating.

A curable resin coating on the proppant can be allowed to cure after the proppant is placed in the subterranean formation for the purpose of consolidating the proppant of a proppant pack to form a "proppant matrix." As used herein, "proppant matrix" means a closely associated group of proppant particles as a coherent mass of proppant. Typically, a cured resin consolidates the proppant pack into a hardened, permeable, coherent mass. After curing, the resin reinforces the strength of the proppant pack and reduces the flow back of proppant from the proppant pack relative to a similar proppant pack without such a cured resin coating.

A resin or curable resin can be selected from natural resins, synthetic resins, and any combination thereof in any proportion. Natural resins include, but are not limited to, shellac. Synthetic resins include, but are not limited to, epoxies, furans, phenolics, and furfuryl alcohols, and any combination thereof in any proportion. An example of a suitable commercially available resin is the EXPEDITE™ product sold by Halliburton Energy Services, Inc. of Duncan, Okla.

By way of another example, some or all of the proppant can be coated with a tackifying agent, instead of, or in addition to, a curable resin. The tackifying agent acts to consolidate and help hold together the proppant of a proppant pack to form a proppant matrix. Such a proppant matrix can be flexible rather than hard. The tackifying-agent-coated proppant in the subterranean formation tends to cause small particulates, such as fines, to stick to the outside of the proppant. This helps prevent the fines from flowing with a fluid, which could potentially clog the openings to pores.

Tackifying agents include, but are not limited to, polyamides, polyesters, polyethers and polycarbamates, polycarbonates, and any combination thereof in any proportion. An example of a suitable commercially available tackifying agent is the SANDWEDGE™ product sold by Halliburton Energy Services, Inc. of Duncan, Okla.

Sand Control and Gravel Packing

Gravel packing is commonly used as a sand-control method to prevent production of formation sand or other fines from a poorly consolidated subterranean formation. In this context, "fines" are tiny particles, typically having a diameter of 43 microns or smaller, that have a tendency to flow through the formation with the production of hydrocarbon. The fines have a tendency to plug small pore spaces in the formation and block the flow of oil. As all the hydrocarbon is flowing from a relatively large region around the wellbore toward a relatively small area around the wellbore, the fines have a tendency to become densely packed and screen out or plug the area immediately around the wellbore. Moreover, the fines are highly abrasive and can be damaging to pumping and oilfield other equipment and operations.

Placing a relatively larger particulate near the wellbore helps filter out the sand or fine particles and prevents them from flowing into the well with the produced fluids. The primary objective is to stabilize the formation while causing minimal impairment to well productivity.

The particulate used for this purpose is referred to as "gravel." In the oil and gas field, and as used herein, the term "gravel" is refers to relatively large particles in the sand size classification, that is, particles ranging in diameter from about 0.1 mm up to about 2 mm. Generally, a particulate having the properties, including chemical stability, of a low-strength proppant is used in gravel packing. An example of a commonly used gravel packing material is sand having an appropriate particulate size range.

In one common type of gravel packing, a mechanical screen is placed in the wellbore and the surrounding annulus is packed with a particulate of a larger specific size designed to prevent the passage of formation sand or other fines. The screen holds back gravel during flow back.

In some gravel packing applications, a resinous material can be coated on the particulate. The term "coated" does not imply any particular degree of coverage on the particulates, which coverage can be partial or complete.

Frac-Packing

The combination of a hydraulically-induced fracture with a gravel-pack completion has been termed a "frac-pac." The primary purpose of a frac-pac completion is to help eliminate the high skins often associated with cased-hole gravel packs by providing a highly conductive flow path through the near-wellbore formation damaged zone.

Carrier Fluid for Particulate

A fluid can be adapted to be a carrier fluid for a particulate. For example, a proppant used in fracturing or a gravel used in gravel packing may have a much different density than the carrier fluid. For example, sand has a specific gravity of about 2.7, whereas water has a specific gravity of 1.0 at Standard Laboratory Conditions of temperature and pressure. A proppant or gravel having a different density than water will tend to separate from water very rapidly.

Increasing Viscosity of Fluid for Suspending Particulate

Increasing the viscosity of a fluid can help prevent a particulate having a different specific gravity than a surrounding phase of the fluid from quickly separating out of the fluid.

A viscosity-increasing agent can be used to increase the ability of a fluid to suspend and carry a particulate material in a fluid. A viscosity-increasing agent can be used for other purposes, such as matrix diversion, conformance control, or friction reduction.

A viscosity-increasing agent is sometimes referred to in the art as a viscosifying agent, viscosifier, thickener, gelling agent; or suspending agent. In general, any of these refers to an agent that includes at least the characteristic of increasing the viscosity of a fluid in which it is dispersed or dissolved. There are several kinds of viscosity-increasing agents or techniques for increasing the viscosity of a fluid.

In general, because of the high volume of fracturing fluid typically used in a fracturing operation, it is desirable to efficiently increase the viscosity of fracturing fluids to the desired viscosity using as little viscosity-increasing agent as possible. In addition, relatively inexpensive materials are preferred. Being able to use only a small concentration of the viscosity-increasing agent requires a lesser concentration of the viscosity-increasing agent in order to achieve the desired fluid viscosity.

Polymers for Increasing Viscosity

Certain kinds of polymers can be used to increase the viscosity of a fluid. In general, the purpose of using a polymer is to increase the ability of the fluid to suspend and carry a particulate material. Polymers for increasing the viscosity of a fluid are preferably soluble in the external phase of a fluid. Polymers for increasing the viscosity of a fluid can be naturally occurring polymers such as polysaccharides, derivatives of naturally occurring polymers, or synthetic polymers.

Water-Soluble Polymers for Increasing Viscosity

Treatment fluids used in high volumes, such as fracturing fluids, are usually water-based. Efficient and inexpensive viscosity-increasing agents for water include certain classes of water-soluble polymers.

The water-soluble polymer can have, for example, an average molecular weight in the range of from about 50,000 to 20,000,000, most preferably from about 100,000 to about 4,000,000.

The viscosity-increasing agent can be provided in any form that is suitable for the particular treatment fluid or application. For example, the viscosity-increasing agent can be provided as a liquid, gel, suspension, or solid additive that is incorporated into a treatment fluid.

The viscosity-increasing agent should be present in a treatment fluid in a form and in an amount at least sufficient to impart the desired viscosity to a treatment fluid. A viscosity-increasing agent may be present in the fluids in a concentration in the range of from about 0.01% to about 5% by weight of the continuous phase therein.

Water Classifications

Total dissolved solids ("TDS") refers to the sum of all minerals, metals, cations, and anions dissolved in water. As most of the dissolved solids are typically salts, the amount of salt in water is often described by the concentration of total dissolved solids in the water.

Freshwater is water containing low concentrations (typically <1%) of dissolved salts and other total dissolved solids.

Broadly speaking, "brine" is often understood to be water containing any substantial concentration of dissolved inorganic salts, regardless of the particular concentration. Therefore, "brine" may broadly refer to water containing anywhere from about 1,000 ppm to high percentages of dissolved salts. Brines used for oil field purposes sometimes contain total dissolved solids of up to about 10% or higher.

More technically, however, the terms "brackish water," "saline water," "seawater," "brine," and other terms regarding water may sometimes be used to refer to more precise ranges of concentrations of TDS.

Crosslinking of Polymer to Increase Viscosity of a Fluid or Form a Gel

The viscosity of a fluid at a given concentration of viscosity-increasing agent can be greatly increased by crosslinking the viscosity-increasing agent. A crosslinking agent, sometimes referred to as a crosslinker, can be used for this purpose. A crosslinker interacts with at least two polymer molecules to form a "crosslink" between them.

If crosslinked to a sufficient extent, the polysaccharide may form a gel with water. Gel formation is based on a number of factors including the particular polymer and concentration thereof, the particular crosslinker and concentration thereof, the degree of crosslinking, temperature, and a variety of other factors known to those of ordinary skill in the art.

The degree of crosslinking depends on the type of viscosity-increasing polymer used, the type of crosslinker, concentrations, temperature of the fluid, etc. Shear is usually required to mix the base gel and the crosslinking agent. Therefore, the actual number of crosslinks that are possible and that actually form also depends on the shear level of the system. The number of crosslinks is believed to significantly alter fluid viscosity.

For a polymeric viscosity-increasing agent, any crosslinking agent that is suitable for crosslinking the chosen monomers or polymers may be used.

Cross-linking agents typically comprise at least one metal ion that is capable of cross-linking the viscosity-increasing agent molecules.

Some crosslinking agents form substantially permanent crosslinks with viscosity-increasing polymer molecules. Such crosslinking agents include, for example, crosslinking agents of at least one metal ion that is capable of crosslinking gelling agent polymer molecules. Examples of such crosslinking agents include, but are not limited to, zirconium compounds (such as, for example, zirconium lactate, zirconium lactate triethanolamine, zirconium carbonate, zirconium acetylacetonate, zirconium maleate, zirconium citrate, zirconium oxychloride, and zirconium diisopropylamine lactate); titanium compounds (such as, for example, titanium lactate, titanium maleate, titanium citrate, titanium ammonium lactate, titanium triethanolamine, and titanium acetylacetonate); aluminum compounds (such as, for example, aluminum acetate, aluminum lactate, or aluminum citrate); antimony compounds; chromium compounds; iron compounds (such as, for example, iron chloride); copper compounds; zinc compounds; sodium aluminate; or a combination thereof.

Preferably, the source of a polyvalent metal cation is derived from a water-soluble salt of the polyvalent metal in which the metal is in the same cationic valence state as the crosslinking species. By this, it is intended to mean that the metal ion which forms the crosslinking need not be freshly formed as by a change in the valence state of the metal ion.

Where present, the cross-linking agent generally should be included in the fluids in an amount sufficient, among other things, to provide the desired degree of cross linking. In some embodiments, the cross-linking agent may be present in the treatment fluids in an amount in the range of from about 0.01% to about 5% by weight of the treatment fluid.

Buffering compounds may be used if desired, for example, to delay or control the cross linking reaction. These may include glycolic acid, carbonates, bicarbonates, acetates, phosphates, and any other suitable buffering agent.

Sometimes, however, crosslinking is undesirable, as it may cause the polymeric material to be more difficult to break and it may leave an undesirable residue in the formation.

Breaking Viscosity of a Fluid

After a treatment fluid is placed where desired in the well and for the desired time, the downhole fluid usually must then be removed from the wellbore or the formation.

For example, in the case of hydraulic fracturing, the fluid should be removed leaving the proppant in the fracture and without damaging the conductivity of the proppant bed. To accomplish this removal, the viscosity of the treatment fluid must be reduced to a very low viscosity, preferably near the viscosity of water, for optimal removal from the propped fracture. Similarly, when a viscosified fluid is used for gravel packing, the viscosified fluid must be removed from the gravel pack.

Reducing the viscosity of a viscosified treatment fluid is referred to as "breaking" the fluid. Chemicals used to reduce the viscosity of treatment fluids are called breakers.

Breakers for reducing viscosity must be selected to meet the needs of each situation. First, it is important to understand the general performance criteria for breaking. In reducing the viscosity of the treatment fluid to a near water-thin state, the breaker must maintain a critical balance. Premature reduction of viscosity during the pumping of a treatment fluid can jeopardize the treatment. Inadequate reduction of fluid viscosity after pumping can also reduce production if the required conductivity is not obtained. A breaker should be selected based on its performance in the temperature, pH, time, and desired viscosity profile for each specific treatment.

In fracturing, for example, the ideal viscosity versus time profile would be if a fluid maintained 100% viscosity until the fracture closed on proppant and then immediately broke to a thin fluid. Some breaking inherently occurs during the 0.5 to 4 hours required to pump most fracturing treatments. One guideline for selecting an acceptable breaker design is that at least 50% of the fluid viscosity should be maintained at the end of the pumping time. This guideline may be adjusted according to job time, desired fracture length, and required fluid viscosity at reservoir temperature.

A typical gravel pack break criteria is a minimum 4-hour break time, however, it is still desirable for a gravel-packing fluid to break within a few days.

No particular mechanism is necessarily implied by breaking or breaker regarding the viscosity of a fluid.

For example, for use a fluid viscosified with a polymeric material as the viscosity-increasing agent, a breaker can operate by cleaving the polymeric linkages of a polymer by hydrolysis of acetyl group, cleavage of glycosidic bonds, oxidative/reductive cleavage, free radical breakage, or a combination of these processes. Accordingly, such a breaker can reduce the molecular weight of the polymer by cutting the long polymer chain. As the length of the polymer chain is cut, the viscosity of the fluid is reduced.

In another example, a breaker may reverse a crosslinking of a viscosity-increasing agent or attack the crosslinker.

Chemical Breakers

Chemical breakers used to help clean up a filtercake or break the viscosity of a viscosified fluid are generally grouped into several classes: oxidizers, enzymes, chelating agents, and acids.

Oxidizers commonly used to reduce viscosity of natural polymers includes, for example, sodium persulfate, potassium persulfate, ammonium persulfate, lithium or sodium hypochlorites, chlorites, peroxide sources (sodium perborate, sodium percarbonate, calcium percarbonate, urea-hydrogen peroxide, hydrogen peroxide, etc.), bromates, periodates, permanganates, etc. In these types of breakers, oxidation reduction chemical reactions occur as the polymer chain is broken.

Different oxidizers are selected based on their performance at different temperature and pH ranges. Consideration is also given to the rate of oxidation at a particular temperature and pH range.

Enzymes are also used to break the natural polymers in oil field applications. They are generally used at low temperature 25° C. (77° F.) to 70° C. (158° F.) as at higher temperature they denature and become ineffective. At very low temperatures, enzymes are not as effective as the rate of breakage of polymer is very slow and they are generally not recommended. Different types of enzymes are used to break different types of bond in the polysaccharides. Some enzymes break only α-glycosidic linkage and some break β-glycosidic linkage in polysaccharides. Some enzymes break polymers by hydrolysis and some by oxidative pathways. A specific enzyme is needed to break a specific polymer/polysaccharide. Enzymes are referred to as Nature's catalysts because most biological processes involve an enzyme. Enzymes are large protein molecules, and proteins consist of a chain of building blocks called amino acids. The simplest enzymes may contain fewer than 150 amino acids while typical enzymes have 400 to 500 amino acids.

Acids also provide a break via hydrolysis. Acids, however, pose various difficulties for practical applications. Acids are not used as a polysaccharide polymer breaker very often because of cost, poor break rate control, chemical compatibility difficulties, and corrosion of metal goods.

A breaker may be included in a treatment fluid in a form and concentration at selected to achieve the desired viscosity reduction at a desired time.

The breaker may be formulated to provide a delayed break, if desired. For example, a suitable breaker may be encapsulated if desired. Suitable encapsulation methods are known to those skilled in the art. One suitable encapsulation method involves coating the selected breaker in a porous material that allows for release of the breaker at a controlled rate. Another suitable encapsulation method that may be used involves coating the chosen breakers with a material that will degrade when downhole so as to release the breaker when desired. Resins that may be suitable include, but are not limited to, polymeric materials that will degrade when downhole.

A treatment fluid can optionally include an activator or a retarder to, among other things, optimize the break rate provided by a breaker. Examples of such activators include, but are not limited to, acid generating materials, chelated iron, copper, cobalt, and reducing sugars. Examples of retarders include sodium thiosulfate, methanol, and diethylenetriamine.

Delayed breakers, activators, and retarders can be used to help control the breaking of a fluid, but these may add additional complexity and cost to the design of a treatment fluid.

pH and pH Adjuster or Buffer

The pH can vary widely depending on the application. For example, the initial pH of the aqueous phase of the treatment fluid is in the range of about 4 to about 11.

In certain embodiments, the treatment fluids can include a pH-adjuster. Preferably, the pH adjuster does not have undesirable properties that would interfere with the function of the drilling or treatment fluid.

The pH-adjuster may be present in the treatment fluids in an amount sufficient to maintain or adjust the pH of the fluid. In some embodiments, the pH-adjuster may be present in an amount sufficient to maintain or adjust the pH of the fluid to a pH in the desired range.

In general, a pH-adjuster may function, among other things, to affect the hydrolysis rate of the viscosity-increasing agent. In some embodiments, a pH-adjuster may be included in the treatment fluid, among other things, to adjust the pH of the treatment fluid to, or maintain the pH of the treatment fluid near, a pH that balances the duration of certain properties of the treatment fluid (for example the ability to suspend particulate) with the ability of the breaker to reduce the viscosity of the treatment fluid or a pH that will result in a decrease in the viscosity of the treatment fluid such that it does not hinder production of hydrocarbons from the formation.

The pH-adjuster may be any other substance known in the art capable of maintaining the pH in a limited range. One of ordinary skill in the art, with the benefit of this disclosure, will recognize the appropriate pH-adjuster and amount thereof to use for a chosen application.

Optional Encapsulation of Solid Agents for Delayed Release

Any solid agent can be encapsulated to delay the release of the solid agent. Encapsulation techniques can be used in embodiments for controlling the delayed release of a breaker, for example.

Solid agents can be encapsulated by any suitable technique including spray coating a variety of coating materials thereon. Such coating materials include, but are not limited to, waxes, drying oils such as tung oil and linseed oil, polyurethanes and cross-linked partially hydrolyzed polyacrylics. Degradable polymers such as polyesters, poly lactic acid, and the like may also be used if desired. A solid agent also may be encapsulated in the form of an aqueous solution contained within a particulate porous solid material that remains dry and free flowing after absorbing an aqueous solution and through which the aqueous solution slowly diffuses. Examples of such particulate porous solid materials include, but are not limited to, diatomaceous earth, zeolites, silica, alumina, metal salts of alumino-silicates, clays, hydrotalcite, styrene-divinylbenzene based materials, cross-linked polyalkylacrylate esters, and cross-linked modified starches. In order to provide additional delay to the release of the solid agent encapsulated in a particulate porous solid material described above, an external coating of a polymeric material through which an aqueous solution slowly diffuses can be placed on the porous solid material. Examples of such polymeric materials include, but are not limited to, EDPM rubber, polyvinyldichloride (PVDC), nylon, waxes, polyurethanes and cross linked partially hydrolyzed acrylics.

Other Fluid Additives

A treatment fluid can contain additives that are commonly used in oil field applications, as known to those skilled in the art. These include, but are not necessarily limited to, inorganic water-soluble salts, salt substitutes (such as trimethyl or tetramethyl ammonium chloride), defoamers, breaker aids, oxygen scavengers, alcohols, scale inhibitors, corrosion inhibitors, hydrate inhibitors, fluid-loss control additives, oxidizers, chelating agents, water-control agents (such as relative permeability modifiers), conductivity enhancing agents, clay stabilizers, sulfide scavengers, fibers, nanoparticles, bactericides, and combinations thereof.

Of course, additives should be selected for not interfering with the purpose of the fluid.

Method of Treating a Well with the Treatment Fluid

A method of treating a well, is provided, the method including: forming a treatment fluid according to any of the various embodiments of the disclosure; and introducing the treatment fluid into the well.

Designing a Fracturing Treatment for a Treatment Zone

Fracturing methods can include a step of designing or determining a fracturing treatment for a treatment zone of the subterranean formation prior to performing the fracturing stage. For example, a step of designing can include: (a) determining the design temperature and design pressure; (b) determining the total designed pumping volume of the one or more fracturing fluids to be pumped into the treatment zone at a rate and pressure above the fracture pressure of the treatment zone; (c) designing a fracturing fluid, including its composition and theological characteristics; (d) designing the pH of the continuous phase of the fracturing fluid, if water-based; (e) determining the size of a proppant of a proppant pack previously formed or to be formed in fractures in the treatment zone; and (f) designing the loading of any proppant in the fracturing fluid.

Designing a Gravel Packing Treatment

Gravel packing methods can include a step of designing or determining a gravel packing treatment for a treatment zone of the subterranean formation. According to an embodiment, the step of designing can include: (a) determining the design temperature and design pressure; (b) determining the total designed pumping volume of the one or more treatment fluids to be pumped into the treatment zone; (c) determining the pumping time and rate; (d) designing the treatment fluid, including its composition and rheological characteristics; (e) designing the pH of the continuous phase of the treatment fluid, if water-based; (f) determining the size of a gravel; and (g) designing the loading of the gravel in the fluid.

Forming Treatment Fluid

A treatment fluid can be prepared at the job site, prepared at a plant or facility prior to use, or certain components of the fluid can be pre-mixed prior to use and then transported to the job site. Certain components of the fluid may be provided as a "dry mix" to be combined with fluid or other components prior to or during introducing the fluid into the well.

In certain embodiments, the preparation of a treatment fluid can be done at the job site in a method characterized as being performed "on the fly." The term "on-the-fly" is used herein to include methods of combining two or more components wherein a flowing stream of one element is continuously introduced into flowing stream of another component so that the streams are combined and mixed while continuing to flow as a single stream as part of the on-going treatment. Such mixing can also be described as "real-time" mixing.

Introducing the Treatment Fluid into the Treatment Zone

Often the step of delivering a fluid into a well is within a relatively short period after forming the fluid, for example, less within 30 minutes to one hour. More preferably, the step of delivering the fluid is immediately after the step of forming the fluid, which is "on the fly."

It should be understood that the step of delivering a fluid into a well can advantageously include the use of one or more fluid pumps.

The method can include the step of, prior to introducing the treatment fluid: isolating a zone of interest in the subterranean.

Introducing while Drilling

In an embodiment, the step of introducing is during drilling of a well.

Introducing Below or Above Fracture Pressure

In an embodiment, the step of introducing is at a rate and pressure below the fracture pressure of the treatment zone. This can be useful, for example, in a gravel-packing step, such as in a frac-packing operation.

In an embodiment, the step of introducing comprises introducing under conditions for fracturing a treatment zone. The fluid is introduced into the treatment zone at a rate and pressure that are at least sufficient to fracture the zone.

Performing a Fracturing Stage

In general, a fracturing treatment preferably includes pumping the one or more fracturing fluids into a treatment zone at a rate and pressure above the fracture pressure of the treatment zone.

Any of the fracturing methods can include a step of monitoring to help determine the end of a fracturing stage. The end of a fracturing stage is the end of pumping into a treatment zone, which can be due to screenout at or near the wellbore or other mechanical or chemical diversion of fluid to a different treatment zone. One technique for monitoring is measuring the pressure in the wellbore along the treatment zone. Another technique includes a step of determining microseismic activity near the zone to confirm an increase in fracture complexity in the treatment zone.

Gravel Packing

In an embodiment, the step of introducing comprises introducing under conditions for gravel packing the treatment zone.

The combination of a hydraulically-induced fracture with a gravel-pack completion has been termed a "frac-pac." The primary purpose of a frac-pac completion is to help eliminate the high skins often associated with cased-hole gravel packs by providing a highly conductive flow path through the near-wellbore formation damaged zone.

Allowing Time for Breaking in the Well

After the step of introducing the treatment fluid, in an embodiment the method includes the step of allowing time for breaking the viscosity of the fluid in the well. This can be accomplished, for example, by shutting in the treatment zone before flowing back fluid from the well. The breaking of the viscosity of the treatment fluid preferably occurs with time under the conditions in the zone of the subterranean fluid.

In various embodiments, the treatment fluid is adapted to break at the design temperature within about 5 days. More preferably, the treatment fluid is adapted to break within 24 hours. Most preferably, the treatment fluid is adapted to break in less than 4 hours at the design temperature for the treatment.

Flow Back Conditions

In various embodiments, a step of flowing back from the treatment zone is within about 5 days of the step of introducing. In another embodiment, the step of flowing back is within about 24 hours of the step of introducing. In some embodiments, the step of flowing back is within about 4 hours of the step of introducing.

Producing Hydrocarbon from Subterranean Formation

Preferably, after any such use of a fluid according to the disclosure, a step of producing hydrocarbon from the well or a particular zone is the desirable objective.

Conclusion

Therefore, the present disclosure is well adapted to attain the ends and advantages mentioned as well as those that are inherent therein.

The exemplary fluids disclosed herein may directly or indirectly affect one or more components or pieces of equipment associated with the preparation, delivery, recapture, recycling, reuse, or disposal of the disclosed fluids. For example, the disclosed fluids may directly or indirectly affect one or more mixers, related mixing equipment, mud pits, storage facilities or units, fluid separators, heat exchangers, sensors, gauges, pumps, compressors, and the like used generate, store, monitor, regulate, or recondition the exemplary fluids. The disclosed fluids may also directly or indirectly affect any transport or delivery equipment used to convey the fluids to a well site or downhole such as, for example, any transport vessels, conduits, pipelines, trucks, tubulars, or pipes used to fluidically move the fluids from one location to another, any pumps, compressors, or motors (for example, topside or downhole) used to drive the fluids into motion, any valves or related joints used to regulate the pressure or flow rate of the fluids, and any sensors (i.e., pressure and temperature), gauges, or combinations thereof, and the like. The disclosed fluids may also directly or indirectly affect the various downhole equipment and tools that may come into contact with the chemicals/fluids such as, but not limited to, drill string, coiled tubing, drill pipe, drill collars, mud motors, downhole motors or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

The particular embodiments disclosed above are illustrative only, as the present disclosure may be modified and practiced in different but equivalent manners apparent to those skilled in the art having the benefit of the teachings herein. It is, therefore, evident that the particular illustrative embodiments disclosed above may be altered or modified and all such variations are considered within the scope of the present disclosure.

The various elements or steps according to the disclosed elements or steps can be combined advantageously or practiced together in various combinations or sub-combinations of elements or sequences of steps to increase the efficiency and benefits that can be obtained from the disclosure.

It will be appreciated that one or more of the above embodiments may be combined with one or more of the other embodiments, unless explicitly stated otherwise.

This illustrative disclosure can be practiced in the absence of any element or step that is not specifically disclosed or claimed.

Furthermore, no limitations are intended to the details of composition, design, or steps herein shown, other than as described in the claims.

What is claimed is:

1. A fluid comprising:
   (A) an aqueous phase; and
   (B) a dimer acid grafted polymer, wherein the dimer acid grafted polymer is at least sparingly soluble in water, and wherein the polymer onto which the dimer acid is grafted is selected from the group consisting of polysaccharides, polyacrylamide, polyacrylate, and polyacrylamide polyacrylate copolymer;
   wherein the polymer is dispersed, hydrated, or dissolved in the aqueous phase.

2. The fluid according to claim 1, wherein the dimer acid grafted polymer is at least soluble in water.

3. The fluid according to claim 1, wherein the polymer onto which the dimer acid is grafted is a polysaccharide.

4. The fluid according to claim 1, wherein the polymer onto which the dimer acid is grafted is selected from the group consisting of: a guar, and a cellulose.

5. The fluid according to claim 1, wherein the polymer onto which the dimer acid is grafted is a homopolymer.

6. The fluid according to claim 1, wherein the dimer acid grafted onto the polymer is formed of one or more unsaturated fatty acids having in the range of 6 to 18 carbon atoms.

7. The fluid according to claim 6, wherein the degree of dimer acid substitution on the polymer is up to about 20 mole % dimer acid:monomeric unit of the polymer.

8. The fluid according to claim 1, wherein the polymer is selected for having at least one monomeric unit that has at least one functional group for crosslinking of the polymer.

9. The fluid according to claim 8, wherein the fluid additionally comprises a crosslinker for the dimer acid grafted polymer.

10. The fluid according to claim 1, wherein the dimer acid grafted polymer is crosslinked.

11. The fluid according to claim 1, wherein the aqueous phase additionally comprises: a surfactant.

12. The fluid according to claim 5, wherein the surfactant is selected from the group consisting of: non-ionic surfactants, cationic surfactants, and any combination thereof.

13. The fluid according to claim 1, wherein the aqueous phase additionally comprises a silane coupling agent.

14. The fluid according to claim 1, wherein the fluid additionally comprises a solid particulate dispersed in the fluid.

15. The fluid according to claim 14, wherein the solid particulate is selected from the group consisting of proppant and gravel.

16. The fluid according to claim 1, wherein the fluid additionally comprises a breaker for chemically releasing the grafted dimer acid from the polymer.

17. The fluid according to claim 16, wherein the breaker additionally breaks at least some polymeric linkages of the polymer.

18. The fluid according to claim 1, wherein the aqueous phase comprises one or more dissolved inorganic salts.

19. The fluid according to claim 1, wherein the aqueous phase is a continuous phase of the fluid.

20. A method comprising:
 (A) forming a fluid according to claim 1; and
 (B) introducing the fluid into a treatment zone of a well.

21. The method according to claim 20, wherein introducing the fluid into the treatment zone is at a rate and pressure at least sufficient to create or extend a fracture in the treatment zone.

22. The method according to claim 20, wherein the fluid includes a breaker, and after introducing the fluid into the treatment zone, allowing time for the breaker to release the grafted dimer acid from the polymer as a free dimer acid.

* * * * *